United States Patent

[11] 3,559,735

[72] Inventor Myron L. Corrin
Fort Collins, Colo.
[21] Appl. No. 845,543
[22] Filed July 28, 1969
[45] Patented Feb. 2, 1971
[73] Assignee Phillips Petroleum Company
a corporation of Delaware
Continuation-in-part of application Ser. No. 688,651, Dec. 7, 1967, now abandoned.

[54] METHOD OF RECOVERING OIL USING PELLETED CARBON BLACK CONTAINING SURFACTANT
7 Claims, No Drawings

[52] U.S. Cl. ..................................................... 166/275, 166/274
[51] Int. Cl. ..................................................... E21b 43/22
[50] Field of Search ........................................... 166/273-275, 268; 252/8.55, 89

[56] References Cited
UNITED STATES PATENTS

| | | | |
|---|---|---|---|
| 3,323,589 | 6/1967 | Harvey | 166/274 |
| 3,326,287 | 6/1967 | Corrin | 166/274 |
| 3,335,794 | 8/1967 | Bond | 166/271 |
| 3,352,788 | 11/1967 | Conlisk | 252/363.5X |
| 3,368,620 | 2/1968 | Harvey | 166/274 |
| 3,384,171 | 5/1968 | Parker | 166/274 |
| 3,401,748 | 9/1968 | Stratton | 166/275X |
| 3,412,792 | 11/1968 | Parker et al. | 166/274 |

*Primary Examiner*—Stephen J. Novosad
*Attorney*—Young and Quigg

ABSTRACT: Flocculent carbon black is pelleted with one or more liquid surfactants and the resulting pellets are transported to the well site, disintegrated, mixed with water to form a stable dispersion, and a slug of the resulting dispersion is injected through a well into an oil stratum and driven toward an offset well to produce oil therein.

METHOD OF RECOVERING OIL USING PELLETED CARBON BLACK CONTAINING SURFACTANT

This application is a continuation-in-part of my copending application Ser. No. 688,651, filed Dec. 7, 1967, now abandoned.

This invention relates to pelleted carbon black and surfactants useful in the production of oil from an oil stratum by water flooding.

It has recently been discovered that carbon black in minute particle form, preferably not exceeding one micron in size, is effective in a water flood operation in displacing an oil from an oil stratum. A surfactant effective in forming a stable dispersion or suspension of the carbon black particles in water is incorporated in the water used in the water flood. Another surfactant having oil-displacing properties is also incorporated in the slug of water.

It is an object of the invention to provide carbon black pellets which are useful in forming a water slug for water flooding an oil stratum to produce oil. Another object is to provide pelleted carbon black containing surfactants effective in oil production which can be dispersed in water at the well site to simplify the oil recovery process. A further object is to provide a process for pelleting carbon black and one or more surfactants useful in oil displacement. Other objects of the invention will become apparent to one skilled in the art upon consideration of the accompanying disclosure.

In accordance with a broad aspect of the invention, pellets consisting essentially of carbon black and one or more surfactants useful in oil production are provided. The carbon black particles comprise flocculent carbon black recovered from the smoke from a carbon black reactor or furnace. Preferably said carbon black particles have a particle size up to and including one micron, but can be larger, e.g., up to 2 microns. More preferably said particles do not exceed 0.1 micron in size. Thus, an overall preferred range of particle size is 0.001 to 1 micron. These minute carbon black particles have been found to pass through the pores of an oil stratum and carry oil-displacing surfactant into the oil stratum to displace oil therefrom. It is preferred to incorporate in the pellets both an oil-displacing surfactant and a second surfactant which assists in dispersing the carbon black in water and in producing a stable suspension of the carbon black. The ratio by weight of surfactant to carbon black in the pellet is in the range of about 0.3:1 to 2.4:1, preferably 0.75:1 to 1.2:1.

Two types of surfactants particularly effective for use in the pellets and in the oil-producing, water flooding operation are disclosed in the copending application Ser. No. 643,362 of H. W. Parker, filed June 5, 1967, now U.S. Pat. No. 3,412,792, issued Nov. 26, 1968. Included among the surfactants effective in displacing oil are nonionic surfactants having the R-X-($-CH_2-CH_2-O-$)$_n$H, wherein R is an aliphatic alkyl of 9 to 20 carbon atoms or an alkylaryl in which the alkyl has from 8 to 12 carbon atoms and the aryl is attached to the X; X is O (oxygen) or S (sulfur); and n averages 4 to 11, preferably 4 to 6.5. These surfactants belong to the families of polyoxyethylene or polyphenoxyethylene ethers and thioethers. The polyoxyethylene species are exemplified by tall oil ethylene oxide, lauryl alcohol ethylene oxide, polyoxyethylene thioether, and polyoxyethlene lauryl ether, having an average chain length on the hydrophilic end in the required range of 4 to 11, preferably 4.5 to 6.5.

A suspension of minute carbon black particles in water containing only an oil-displacing surfactant has the disadvantage of the carbon black tending to settle out or the particles thereof to agglomerate if the suspension is allowed to stand for a substantial length of time. Also, there is a tendency to plug in the stratum when brackish water is encountered. To overcome these difficulties, certain dispersing surfactants are added to stabilize the suspension and prevent agglomeration. These surfactants have little or no oil-displacing properties but have a much greater dispersing and stabilizing capacity than the oil-displacing surfactants. These dispersing and stabilizing surfactants include those which have the formula R'-O-($-CH_2-CH_2-O-$)$_m$H wherein R' is an aliphatic alkyl of 5 to 20 carbon atoms or an alkylaryl in which the alkyl has 8 to 20 carbon atoms, and m averages 30 to 100. Surfactants in which m is less than 30 have little or no dispersing and stabilizing effect when incorporated in the suspension of carbon black in the oil-displacing surfactant solution.

An excellent oil-displacing surfactant which is typical of the polyphenoxyethylene species is one available under the trade name Igepal CO-530 (a product of Antara Chemical Division of General Aniline and Film Corporation) and is a nonylphenoxypoly(ethyleneoxy)ethanol having an average chain length on the hydrophilic end of about 6 to 6.5 mols of ethylene oxide. Another product from the same source having the trade name Igepal CO-990 of different ethylene oxide chain length is an excellent suspending and stabilizing surfactant. This product is a nonylphenoxypoly(ethyleneoxy)ethanol having an average chain length on the hydrophilic end of 95—100 mols or units of ethylene oxide and is typical of the above-described dispersing and stabilizing surfactants. These surfactants have been found to function particularly well with a furnace carbon black available from Phillips Petroleum Company under the trade name Philblack I. However, other minute carbon black particles of similar character are useful in the invention. The carbon black raw material may be modified prior to incorporation in the pellets by oxidizing, sulfonating, or ethoxylating to increase the degree to which the carbon black is hydrophilic. Methods of so modifying the carbon black particles are known in the art.

Igepal CO-530 is a normally liquid surfactant while Igepal CO-990 is a readily meltable wax. Both are soluble in water and may be dissolved therein to provide a pelleting medium. However, it is preferred to mix the two types of surfactant and heat the mixture until the wax melts or is in solution in the liquid surfactant. This nonaqueous mixture of surfactants provides an excellent pelleting medium for the carbon black. The amount of pelleting medium used is preferably in the range of about 40 to 60 weight percent of the mixture, the carbon black making up the balance. It has been found desirable to incorporate up to about 2.4 pounds of surfactant in the pellets per pound of carbon black. Generally, the surfactant content of the pelleting medium is adjusted to provide a weight ratio of surfactant to black in the range of 0.3:1 to 2.4:1. These proportions function well in the water flood operation in displacing oil. The proportions of the two surfactants range from about 3:2 to 2:3. These proportions are preferred but other proportions of the surfactants can be incorporated in the pellets without departing from the scope of the invention. In fact, either one of the surfactants, alone, can be incorporated in the pellets, and the other surfactant can be added to the water slug at the time of dispersing the carbon black, containing the other surfactant; but to gain the full benefit of the invention, both types of surfactant are preferably incorporated in the carbon black pellets in the proportions suitable for forming the stable suspension and displacing oil from an oil stratum.

At the well site, the carbon black pellets of the invention containing both types of surfactant are disintegrated in any suitable manner as by crushing, grinding, etc., and adding the disintegrated pellets and surfactant to a sufficient volume of water to form the slug injected into the oil stratum in the displacing operation. It is also feasible to introduce the pellets into the water of the slug and disintegrate and disperse the carbon black particles thereafter by any suitable means. A mixing chamber containing counterrotating stirrers or beaters is suitable for this purpose. Preferably, the carbon black pellets of the invention are dispersed in the water of the slug in an amount sufficient to form a dispersion of carbon black in the range of 0.005 to 2 weight percent of the water. Any manner of forming the stable dispersion of the carbon black in the presence of the surfactants is within the scope of the invention.

In order to illustrate the invention without unduly restricting the same, the following specific examples are presented.

EXAMPLE I

A furnace carbon black, Philblack I, Igepal CO-530, and Igepal CO-990 are pelleted to provide proportions of 40 pounds of black and 24 pounds of each surfactant. The pelleting is effected in a pug mill with liquid surfactant prepared by mixing and heating the two surfactants until the solid Igepal CO-990 melts and metering the carbon black and liquid surfactant into the pug mill. The resulting pellets are firm enough to stand transporting.

An aqueous fluid drive slug is prepared from the pellets by adding 8.8 pounds of pellets (containing both surfactants) to 1000 pounds of water and agitating the resulting mixture to form a stable dispersion of the black. A resulting slug of aqueous carbon black suspension amounting to about 0.5 pore volume of the sweep area of a well pattern comprising a central well and 6 ring wells on about 600 ft. spacing is injected through the central well and driven toward the ring wells by a following water drive. Oil is produced in the ring wells and recovered by pumping.

EXAMPLE II

Philblack I and Igepal CO-530 are pelleted to provide proportions of 40 pounds of black and 24 pounds of surfactant by diluting the surfactant with about 16 pounds of water and pelleting the black in a pug mill as in Example I. The pellets are then heated with 350° F. air circulating through the pellets to drive off water and increase the strength thereof.

An aqueous water flood is effected in the manner of Example I using 6.4 pounds of pellets per 1000 pounds of water and adding about 2.4 pounds of Igepal CO-990 per 1000 pounds of water to the slug to form a relatively stable dispersion of the carbon black.

Certain modifications of the invention will become apparent to those skilled in the art and the illustrative details disclosed are not to be construed as imposing unnecessary limitations on the invention.

I claim:

1. A process for recovering oil from an oil stratum by aqueous fluid drive which comprises the steps of:
    a. disintegrating in water pellets consisting essentially of minute carbon black particles having a particle size of up to 2 microns and at least one surfactant, said surfactant including an oil-displacing surfactant or a surfactant effective in suspending said black in water and stabilizing the resulting suspension, and forming a uniform dispersion of said carbon black in said water;
    b. injecting a substantial slug of the dispersion of step (a) through an injection well into said stratum;
    c. driving the slug of step (b) toward an offset production well in said stratum so as to displace oil into said production well; and
    d. recovering the produced oil.
2. The process of claim 1 wherein said carbon black particles are of no larger than 1 micron size.
3. The process of claim 1 wherein said carbon black dispersing and stabilizing surfactant is selected from the group

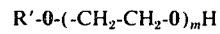

$$R'\text{-}O\text{-}(\text{-}CH_2\text{-}CH_2\text{-}O)_m H$$

wherein R' is an aliphatic alkyl of 5 to 20 carbon atoms or an alkylaryl in which the alkyl has 8 to 12 carbon atoms and the aryl is attached to the O, and $m$ averages 30 to 100; and said oil-displacing surfactant is selected from the group

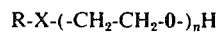

$$R\text{-}X\text{-}(\text{-}CH_2\text{-}CH_2\text{-}O\text{-})_n H$$

wherein R is an aliphatic alkyl of 9 to 20 carbon atoms or an alkylaryl in which the alkyl has 8 to 20 carbon atoms and the aryl is attached to X is oxygen or sulfur, and $n$ averages 4 to 11.

4. A process for recovering oil from an oil stratum by aqueous fluid drive which comprises the steps of:
    a. disintegrating in water sufficient pellets consisting essentially of carbon black particles of no larger than 1 micron size and at least one surfactant in the ratio by weight of surfactant to black in the range of 0.3:1 to 2.4:1, said surfactant including an oil-displacing surfactant or a surfactant effective in suspending said black in water and stabilizing the resulting suspension, and forming a uniform dispersion of said black in said water in the range of 0.005 to 2 weight percent of the water;
    b. injecting a substantial slug of the dispersion of step a. through an injection well into said stratum;
    c. driving the slug of step b. toward an offset production well in said stratum so as to displace oil into said production well; and
    d. recovering the produced oil.
5. The process of claim 4 wherein said surfactant is one of the group

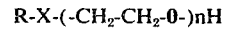

$$R\text{-}X\text{-}(\text{-}CH_2\text{-}CH_2\text{-}O\text{-})nH$$

wherein R is an aliphatic alkyl of 9 to 20 carbon atoms or an alkylaryl in which the alkyl has 8 to 20 carbon atoms and the aryl is attached to $X$; $X$ is oxygen or sulfur, and $n$ averages 4 to 11;

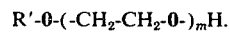

$$R'\text{-}O\text{-}(\text{-}CH_2\text{-}CH_2\text{-}O\text{-})_m H.$$

wherein R' is an aliphatic alkyl of 5 to 20 carbon atoms or an alkylaryl in which the alkyl has 8 to 12 carbon atoms and the aryl is attached to the o, and $m$ averages 30 to 100; and mixtures thereof.

6. The process of claim 4 wherein said pellets include a carbon black dispersing and stabilizing surfactant and an oil-displacing surfactant.
7. The process of claim 4 wherein said pellets include a nonylphenoxypolyethanol having an average chain length on the hydrophilic end wherein $n$ is in the range of 6 to 6.5 as said oil-displacing surfactant and a nonylphenoxypolyethanol having an average chain length on the hydrophilic end wherein $n$ is in the range of 30 to 00 as a carbon black dispersing and stabilizing surfactant, the proportions of said surfactants being in the range of 3:2 to 2:3.

UNITED STATES PATENT OFFICE

CERTIFICATE OF CORRECTION

Patent No. 3,559,735                                          Dated February

Myron L. Corrin

It is certified that error appears in the above-identified patent and that said Letters Patent are hereby corrected as shown below:

Column 4, line 13, after "X" insert -- ; X --; column 4, line 34, in the form there given "n" should be a sub letter as follows -- $R-X-(-CH_2-CH_2-O-)_n H$ --; column line 44, delete "o" and insert therefor -- 0 --; column 4, line 54, delete "OO" and insert therefor -- 100 --.

Signed and sealed this 13th day of July 1971.

(SEAL)
Attest:

EDWARD M. FLETCHER, JR.                             WILLIAM E. SCHUYLER, JR.
Attesting Officer                                          Commissioner of Patents